United States Patent [19]

Kamen et al.

[11] Patent Number: 4,612,967
[45] Date of Patent: Sep. 23, 1986

[54] PADDED CAR COVER

[76] Inventors: Christopher R. Kamen; James E. Bollinger, both of 351 Upper Lake Rd., Thousand Oaks, Calif. 91361

[21] Appl. No.: 701,548
[22] Filed: Feb. 14, 1985
[51] Int. Cl.$^4$ ............................................. B60J 11/00
[52] U.S. Cl. ............................ 150/52 K; 150/52 R; 206/521; 296/136
[58] Field of Search ..................... 150/52 R, 52 K; 206/521, 523; 296/136

[56] References Cited

U.S. PATENT DOCUMENTS

| | | | |
|---|---|---|---|
| 1,914,866 | 6/1933 | Rodgers | 206/521 |
| 2,158,674 | 5/1939 | Cohen . | |
| 2,255,412 | 9/1941 | Cohen . | |
| 2,688,513 | 9/1954 | Poirier . | |
| 2,979,246 | 4/1961 | Liebeskind | 206/523 |
| 2,994,356 | 8/1961 | Fleming | 150/52 K |
| 3,163,194 | 12/1964 | Berry et al. | 150/52 R |
| 3,397,302 | 8/1968 | Hosford . | |
| 3,633,643 | 1/1972 | Stilwell | 150/52 R |
| 3,806,950 | 4/1974 | Spencer-Foote | 206/594 X |
| 3,990,495 | 11/1976 | LaBarba | 150/52 R X |
| 4,041,999 | 8/1977 | Miller | 150/52 K |
| 4,131,269 | 12/1978 | Brattrud . | |
| 4,294,483 | 10/1981 | Ferris | 296/136 |

FOREIGN PATENT DOCUMENTS

| | | | |
|---|---|---|---|
| 101822 | 6/1983 | Japan | 296/136 |
| 251062 | 4/1926 | United Kingdom | 150/52 R |
| 851044 | 10/1960 | United Kingdom | 150/52 R |
| 398421 | 2/1974 | U.S.S.R. | 296/136 |

Primary Examiner—William Price
Assistant Examiner—Sue A. Weaver
Attorney, Agent, or Firm—Henderson & Sturm

[57] ABSTRACT

A padded car cover apparatus (10) comprising a car cover member (13) comprising an inverted car cover envelope (20) having two side portions (17') and (18') wherein each of the side portions is provided with a padding member (24), that is removably received in an elongated pocket member (21).

6 Claims, 4 Drawing Figures

PADDED CAR COVER

TECHNICAL FIELD

The present invention relates generally to protective covers for cars.

BACKGROUND OF THE INVENTION

The prior art is replete with protective devices that cover all, or selected portions, of diverse vehicles, as can be seen by reference to U.S. Pat. Nos. 2,688,513; 3,397,302; 4,131,269; 2,158,674; and 2,255,412.

The primary purpose of these prior art devices is to provide protection against inclement weather and/or air borne contamination.

Most, if not all, of the commercially available car covers serve a very simple purpose and function, which is to protect the finish of the vehicles upon which they are employed by providing a barrier to the deleterious effects of the sun, wind, rain and snow.

While these prior art devices are more than adequate for their limited purposes, they are woefully deficient in one particular respect and, it was the awareness of this deficiency that prompted the development of the present invention.

SUMMARY OF THE INVENTION

The present invention comprises in general a car cover unit and a padded unit. The car cover unit outwardly resembles a standard envelope style car cover device that surrounds the top and sides of a vehicle, and extends generally below the main body of a vehicle.

The padded unit is operatively associated with the sides of the car cover unit and may be formed integrally therewith; or, the padded unit may be formed as a separate unit that is removably secured to the sides of the car cover unit.

The padded unit further extends along a major portion of the sides of the cover unit in the vicinity of the car molding strip found on most late model cars and provides a cushioned surface along the sides of the cars regardless of whether or not they are provided with a molding strip.

The primary purpose and function of the padding unit being to form an impact absorbing barrier to absorb the force from the doors of closely parked cars on either side of the covered vehicle.

Even though most vehicles are provided with their own protective molding, it is a well recognized fact that given the different contours of individual car doors and individual car body configuration, it is virtually impossible to expect a protective molding strip to protect the side of the vehicle from more than a few of the potential points of contact between adjacent vehicles having different body styles.

It was further recognized that the thin layer of material employed in the commercially available car covers offered minimal protection at best to this type of impact. In addition, it was also appreciated that it would be both economically impractical and inacceptable from a consumer's standpoint to uniformly expand the thickness of the car cover material to provide the desired effect.

As just noted, a thicker version of the standard car cover would not only be prohibitively expensive to produce, but it would also be bulky and unwiedly to install and remove from the car as well as store when not in use.

A solution to the aforementioned problems was sought, found, and is embodied in the apparatus that forms the basis of the present invention.

BRIEF DESCRIPTION OF THE DRAWINGS

These and other objects, advantages and novel features of the invention will become apparent from the detailed description of the best mode for carrying out the invention which follows particularly when considered in conjunction with the accompanying drawings, wherein.

BEST MODE FOR CARRYING OUT THE INVENTION

Figure 1:
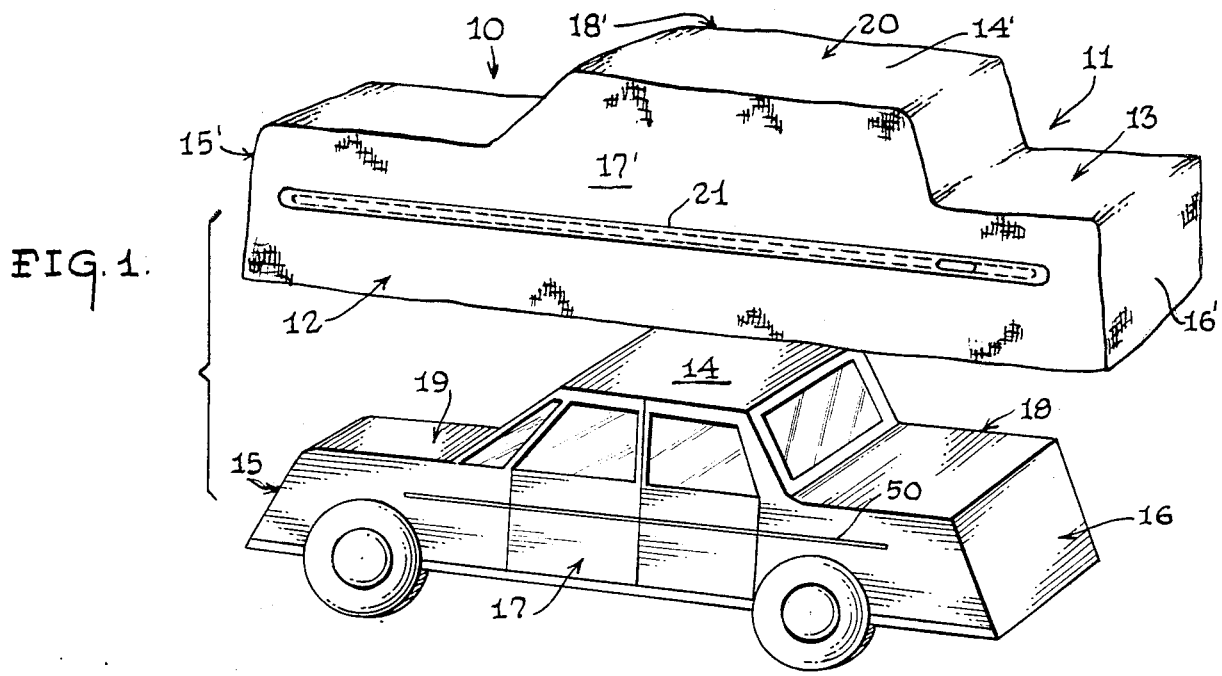
FIG. 1 is an exploded perspective view of the preferred embodiment of this invention.

As can best be seen by reference to the drawings, the padded car cover apparatus that forms the basis of the present invention is designated generally by the reference numeral (10). The apparatus (10) comprises in general a car cover unit (11) and a padded unit (12). These units will now be described in seriatim fashion.

The car cover unit (11) can best be seen in FIG. 1 and comprises a cover member (13) dimensioned to substantially envelope the top (14) and all four sides (15, 16, 17, 18) of an automobile (19). As shown in FIG. 1, the cover member (13) forms an inverted fabric envelope (20) having a top portion (14'), a front portion (15'), a rear portion (16') and two side portions (17') and (18') which correspond with the complementary surfaces on the automobile (19).

Figure 2:
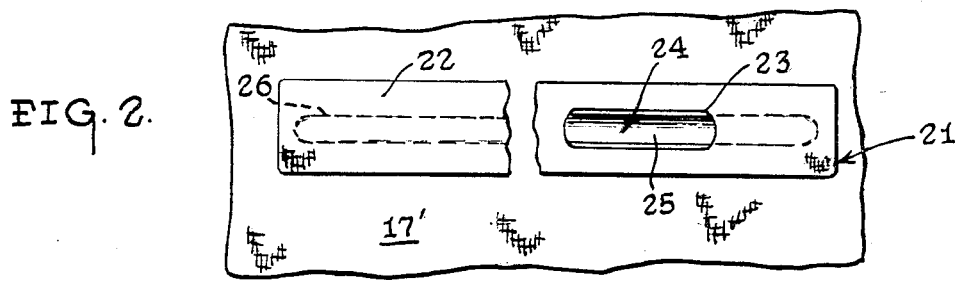
FIG. 2 is a detail view of the cooperation between the car cover unit and the padded unit of the preferred embodiment.

The preferred embodiment of the padded unit (12) is depicted in FIGS. 1 and 2, wherein the car cover envelope (20) is provided with at least one pocket member (21) formed on both of the car cover side portions (17') and (18').

As can best be seen in FIG. 2, the pocket member (21) comprises an elongated pocket element (22) formed on the exterior surface of the side portions (17') and (18') and having an elongated aperture (23) formed therein which is disposed proximate to one end of the respective side portions (17') and (18').

The elongated aperture (23) is further adapted to releasably receive an elongated padding member (24) which substantially occupies the interior volume of the pocket element (22). The padding member (24) in this embodiment comprises an elongated resilient tubular padding element (25) having at least one tapered end (26) which facilitates the insertion of the padding member (24) into the pocket element (22).

It should also be appreciated at this juncture that the padding member (24) may have other than a tubular configuration and could conceivably have a semi-circular or even generally rectangular cross-sectional configuration. It is only necessary for the purpose of this invention that the padding member (24) extend a substantial distance along the side of the vehicle and project a sufficient distance beyond the car molding (50) to provide protection for the vehicle's exterior surface.

In the embodiment illustrated in FIGS. 1 and 2, the aperture (23) is spaced from the end of the pocket member (21), and in this version the tapered end (26) of the padding member (24) is inserted through the aperture (23) until the padding member (24) contacts the far end of the pocket member (21). At this point the other end of the resilient padding member (24) is flexed and inserted through the aperture (23) towards the other end of the pocket member.

The aforementioned arrangement provides a positive engagement of the padding member (24) within the pocket member (21). It should be appreciated however, that while less acceptable, the aperture (23) may be disposed at the very end of the pocket member so that the insertion and retraction of the padding member (24) may be accomplished in a straight line manner.

Figure 3:
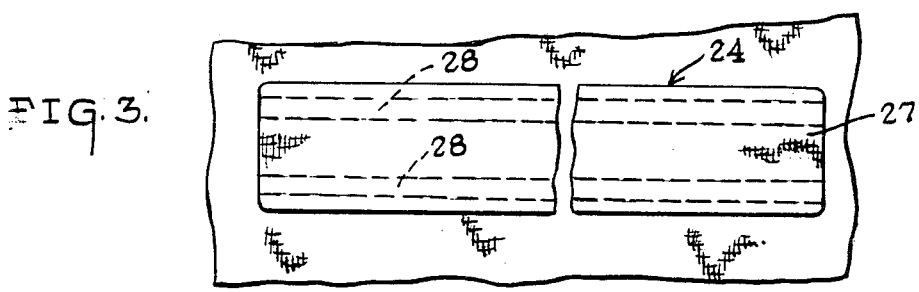
FIG. 3 is a detail view of one alternate version of the preferred embodiment.

In an alternate embodiment illustrated in FIG. 3, the padding member (24) comprises an elongated generally rectangular padded mat element (27) that is releasably attached to the side portions (17') and (18') of the cover unit (11) by suitable releaseable fastening means (28) such as snaps, buckles, VELCRO fasteners, or the like.

Figure 4:
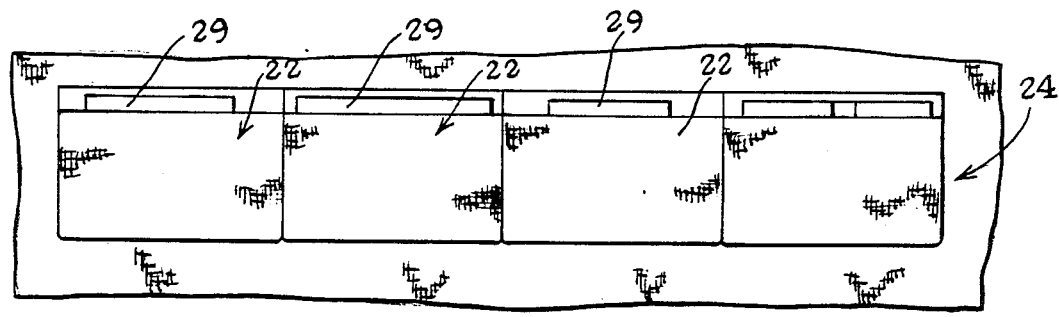
FIG. 4 is a detail view of another alternate version of the preferred embodiment.

In another embodiment illustrated in FIG. 4, the side portions (17') and (18') are provided with pocket members (21) that are divided into a plurality of individual pocket elements (22). In this embodiment, the padding member (24) comprises a plurality of generally rectangular padded elements (29) that are dimensioned to be received within the pocket elements (22).

In all of the embodiments heretofore described, the essential feature of the improved car cover involves a distinct padding member (24) operatively associated with the side portions (17') and (18') of the car cover to provide an extra measure of protection in addition to the protection normally afforded by the car cover fabric thickness.

Having thereby described the subject matter of this invention, it should be obvious that many modifications, substitutions and variations of the invention are possible in light of the above teachings. It is therefore to be understood that the invention as taught and described herein is only to be limited to the extent of the breadth and scope of the appended claims.

I claim:

1. An improved car cover apparatus for use in combination with a car wherein said car cover apparatus comprises:

a car cover member forming an inverted fabric envelope over a car, wherein said fabric envelope has a top portion, a front portion, a rear portion and two side portions;

elongated pocket elements extending along said side portions of said cover member wherein each elongated pocket element is provided with an elongated aperture disposed proximate one end; and an elongated resilient padding element dimensioned to be received through said aperture in each elongated pocket element for disposition of said elongated resilient padding elements along the two side portions of said cover member.

2. An improved car cover apparatus as in claim 1; wherein, said elongated apertures are disposed proximate to, but spaced from said one end of said pocket elements; and, said elongated resilent padding elements are held captive by both ends of said pocket elements.

3. An improved car cover apparatus as in claim 2; wherein, one end of said elongated resilient padding elements is tapered to facilitate the insertion of said elongated resilient padding elements into said pocket elements through said elongated apertures.

4. An improved car cover apparatus as in claim 3, wherein, said elongated resilent padding elements are generally tubular in configuration.

5. An improved car cover apparatus as in claim 3; wherein, said elongated resilient padding elements have generally semi-circular cross sectional configuration.

6. An improved car cover apparatus as in claim 3, wherein, said elongated resilient padding elements have a generally rectangular cross sectional configuration.

* * * * *